US012307972B2

(12) United States Patent
Lee

(10) Patent No.: US 12,307,972 B2
(45) Date of Patent: *May 20, 2025

(54) PIXEL WHICH IS CAPABLE OF PREVENTING A COLOR DEVIATION AND DISPLAY DEVICE INCLUDING THE SAME

(71) Applicant: Samsung Display Co., Ltd., Yongin-Si (KR)

(72) Inventor: Jae Hoon Lee, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,904

(22) Filed: Mar. 15, 2024

(65) Prior Publication Data

US 2024/0221667 A1 Jul. 4, 2024

Related U.S. Application Data

(63) Continuation of application No. 18/142,057, filed on May 2, 2023, now Pat. No. 11,935,477.

(30) Foreign Application Priority Data

Jul. 18, 2022 (KR) ........................ 10-2022-0088541

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01);
(Continued)

(58) Field of Classification Search
CPC ......... G09G 3/3233; G09G 2300/0819; G09G 2300/0852; G09G 2300/0861;
(Continued)

(56) References Cited

U.S. PATENT DOCUMENTS 11,120,741 B2 9/2021 Umezawa
11,238,786 B2 2/2022 Byun et al.
(Continued)

FOREIGN PATENT DOCUMENTS

KR 10-2021-0083151 A 7/2021
KR 10-2021-0137328 A 11/2021
(Continued)

*Primary Examiner* — Rodney Amadiz
(74) *Attorney, Agent, or Firm* — Innovation Counsel LLP

(57) ABSTRACT

A pixel includes a driving transistor having a gate electrode connected to a first node and connected between a first power line to which a first power voltage is applied and a second node, a first initialization transistor having a gate electrode connected to a first scan line and connected between the second node and a first initialization power line to which a first initialization power voltage is applied, a second initialization transistor having a gate electrode connected to the first scan line and connected between a third node and a second initialization power line to which a second initialization power voltage is applied, a first capacitor connected between the first node and the second node, a second capacitor connected between the first power line and the second node, and a light emitting element connected between the third node and a second power line.

16 Claims, 9 Drawing Sheets

(52) U.S. Cl.
CPC . *G09G 2300/0861* (2013.01); *G09G 2310/08* (2013.01); *G09G 2320/0666* (2013.01); *G09G 2330/028* (2013.01)

(58) Field of Classification Search
CPC ....... G09G 2310/08; G09G 2320/0666; G09G 2330/028; G09G 2300/0417; G09G 2310/0251; G09G 2320/0242; G09G 3/3258; G09G 3/32; G09G 3/3266; G09G 3/3275; G09G 2300/0426; G09G 2300/043; G09G 2300/0842; G09G 2310/061; G09G 2330/021
See application file for complete search history.

(56) References Cited

U.S. PATENT DOCUMENTS

| | | | | |
|---|---|---|---|---|
| 11,335,757 | B2 | 5/2022 | Kim et al. | |
| 11,417,257 | B2 | 8/2022 | You et al. | |
| 11,935,477 | B2 * | 3/2024 | Lee | G09G 3/3233 |
| 2020/0211452 | A1 | 7/2020 | Lee et al. | |

FOREIGN PATENT DOCUMENTS

| | | | |
|---|---|---|---|
| KR | 10-2021-0146853 | A | 12/2021 |
| KR | 10-2022-0009360 | A | 1/2022 |

* cited by examiner

FIG. 4A

| | Change in color coordinate of white | | Luminance change of light emitting element emitting light of green | | | |
|---|---|---|---|---|---|---|
| | Δx | Δy | W | R | G | B |
| LTPS @11G | −0.001 | 0.003 | 24% | 25% | 24% | 19% |
| Oxide @11G | −0.018 | 0.049 | 35% | −9% | 80% | 1% |
| Oxide @31G | −0.0061 | 0.0096 | 10.5% | 1.0% | 16.4% | 5.8% |

SL: SL1, SL2, SL3
DRS: GW, GR, GI, EM1, Vdata

SL: SL1, SL2, SL3
DRS: GW, GR, GI, EM1, EM2, Vdata

PIXEL WHICH IS CAPABLE OF PREVENTING A COLOR DEVIATION AND DISPLAY DEVICE INCLUDING THE SAME

CROSS-REFERENCE TO RELATED APPLICATION

The present application is a continuation application of U.S. patent application Ser. No. 18/142,057 filed on May 2, 2023, which claims priority under 35 U.S.C. § 119(a) to Korean patent application No. 10-2022-0088541 filed on Jul. 18, 2022, in the Korean Intellectual Property Office, the Korean patent application is incorporated herein by reference.

BACKGROUND

1. Technical Field

The technical field relates to a pixel and a display device including the same.

2. Related Art

Recently, interest in information displays has been increased. Accordingly, research and development of display devices have been continuously conducted.

A display device includes a plurality of pixels connected to data lines and scan lines. Each pixel includes a pixel circuit and a light emitting element, and the light emitting element emits light with a predetermined luminance corresponding to a driving current supplied from a driving transistor through the pixel circuit.

The light emitting element emits light of red (R), green (G) or blue (B) according to a kind of material constituting a light emitting layer. Since an impedance of each light emitting element varies according to temperature, a light emission amount of the light emitting element may be changed. Accordingly, a color deviation between light emitting elements occurs, and therefore, the display quality of the display device may be deteriorated.

SUMMARY

Embodiments may be related a pixel and a display device including the same which can prevent a problem such as a color deviation by reducing temperature sensitivity of a light emitting element.

In accordance with embodiments, a pixel may include the following elements: a driving transistor having a gate electrode connected to a first node, the driving transistor being connected between a first power line to which a first power voltage is applied and a second node, a first initialization transistor having a gate electrode connected to a first scan line, the first initialization transistor being connected between the second node and a first initialization power line to which a first initialization power voltage is applied, a second initialization transistor having a gate electrode connected to the first scan line, the second initialization transistor being connected between a third node and a second initialization power line to which a second initialization power voltage is applied; a first capacitor connected between the first node and the second node, a second capacitor connected between the first power line and the second node, and a light emitting element connected between the third node and a second power line.

The pixel may further include a control transistor having a gate electrode connected to a first emission control line, the control transistor being connected between the second node and the third node.

During a period in which a threshold voltage of the driving transistor is compensated, a first emission control signal applied to the first emission control line may have a gate-off voltage.

The driving transistor may be connected directly to the first power line.

The second initialization power voltage may have a voltage level higher than a voltage level of the first initialization power voltage and have a voltage level lower than a voltage level of a threshold voltage of the light emitting element.

The first initialization transistor may be turned on in response to an initialization signal applied to the first scan line, and compensate for a threshold voltage of the driving transistor by applying the first initialization power voltage to the second node.

The second initialization transistor may be turned on in response to an initialization signal applied to the first scan line, and initialize an anode of the light emitting element by applying the second initialization power voltage to the second node.

The pixel may further include: a first switching transistor having a gate electrode connected to a second scan line, the first switching transistor being connected between a data line to which a data signal is applied and the first node, and a second switching transistor having a gate electrode connected to a third scan line, the second switching transistor being connected between a reference power line to which a reference power voltage is applied and the first node.

The pixel may further include a third switching transistor having a gate electrode connected to a second emission control line, the third switching transistor being connected between the first power line and the driving transistor.

During the period in which the threshold voltage of the driving transistor is compensated, a second emission control signal applied to the second light emitting control line may have a gate-on voltage.

Embodiments may be related to a display device. The display device may include the following elements: a plurality of pixels connected to a data line, a first emission control line, a first scan line, a second scan line, and a third scan line; an emission driver configured to supply a first emission control signal to the first emission control line, a scan driver configured to supply an initialization signal, a write signal, and a reset signal respectively to the first scan line, the second scan line, and the third scan line, a data driver configured to supply a data voltage to the data line, and a power voltage generator configured to supply a first power voltage, a second power voltage, a reference power voltage, a first initialization power voltage, and a second initialization power voltage to the pixel, wherein the pixel may include a driving transistor having a gate electrode connected to a first node, the driving transistor being connected between a first power line to which the first power voltage is applied and a second node, a first initialization transistor having a gate electrode connected to the first scan line, the first initialization transistor being connected between the second node and a first initialization power line to which the first initialization power voltage is applied, a second initialization transistor having a gate electrode connected to the first scan line, the second initialization transistor being connected between a third node and a second initialization power line to which the second initialization power voltage is applied, a first capacitor connected between the first node and the second node, a second capacitor connected between the first power line and the second node, and a light emitting element connected between the third node and a second power line to which a second power voltage is applied.

The pixel may further include a control transistor having a gate electrode connected to the first emission control line, the control transistor being connected between the second node and the third node.

The driving transistor may be connected directly to the first power line.

The second initialization power voltage may have a voltage level higher than a voltage level of the first initialization power voltage, and have a voltage level lower than a voltage level of a threshold voltage of the light emitting element.

The first initialization transistor may be turned on in response to the initialization signal applied to the first scan line, and compensate for a threshold voltage of the driving transistor by applying the first initialization power voltage to the second node.

The second initialization transistor may be turned on in response to the initialization signal applied to the first scan line, and initialize an anode of the light emitting element by applying the second initialization power voltage to the second node.

The pixel may further include: a first switching transistor having a gate electrode connected to the second scan line, the first switching transistor being connected between the data line to which a data signal is applied and the first node; and a second switching transistor having a gate electrode connected to the third scan line, the second switching transistor being connected between a reference power line to which the reference power voltage is applied and the first node.

The pixel may further include a third switching transistor having a gate electrode connected to a second emission control line, the third switching transistor being connected between the first power line and the driving transistor. The emission driver may further supply the second emission control signal to the second emission control line.

During a period in which the threshold voltage of the driving transistor is compensated, a second emission control signal applied to the second light emitting control line has a gate-on voltage.

During a period in which a threshold voltage of the driving transistor is compensated, a first emission control signal applied to the first emission control line may have a gate-off voltage.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

It will be understood that when an element is referred to as being "between" two elements, it can be the only element between the two elements, or one or more intervening elements may also be present. Like reference numerals refer to like elements throughout.

FIG. 4A is a table illustrating luminance change and color coordinate change of white according to temperature change for each kind of light emitting elements.

DETAILED DESCRIPTION

Figure 1:
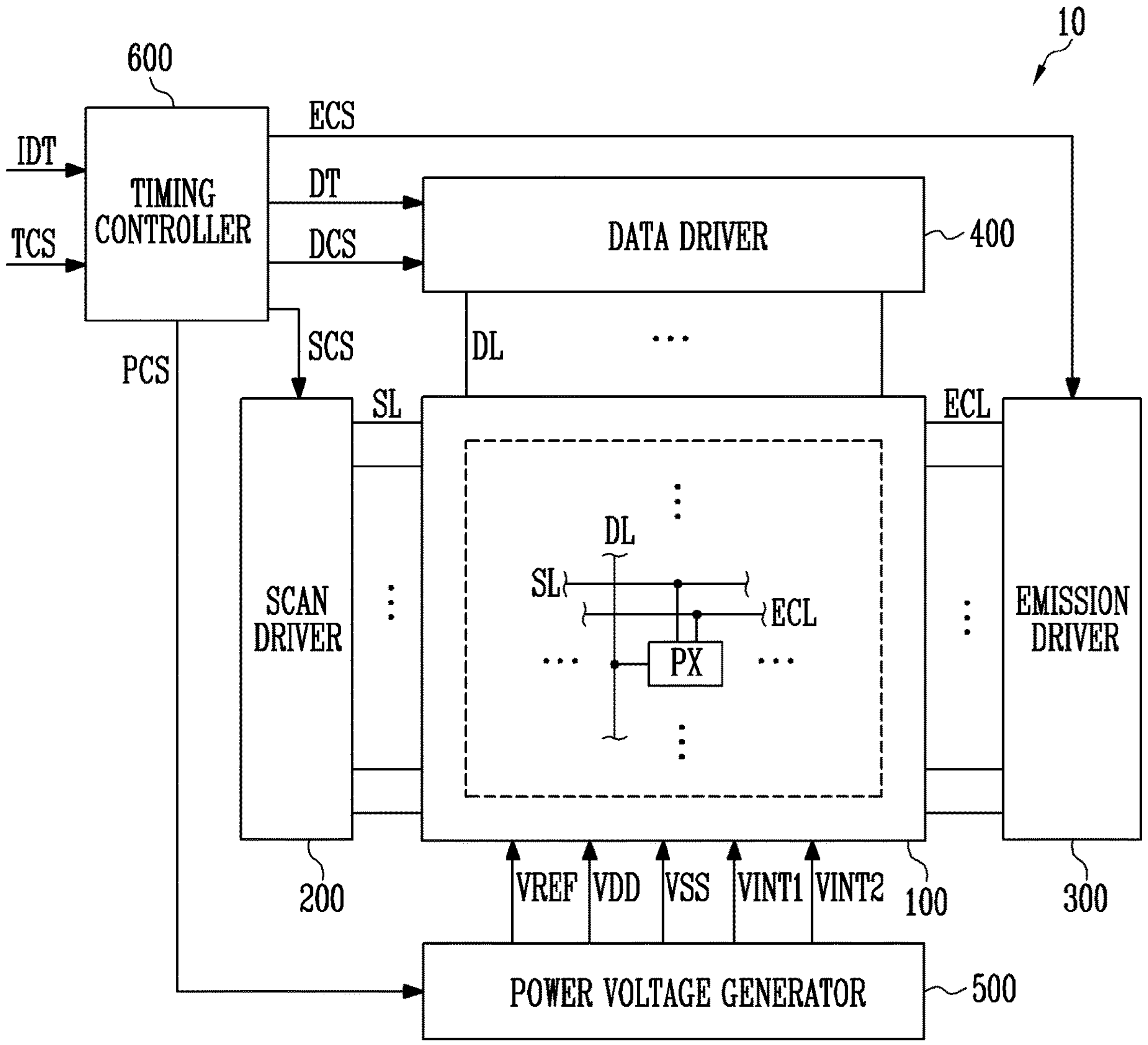
FIG. 1 is a block diagram illustrating a display device in accordance with embodiments.

The present disclosure may be various altered and have different shape, therefore the detailed description may only illustrate in detail with particular examples. However, the examples do not limit to certain shapes but apply to all the change and equivalent material and replacement. The drawings included are illustrated a fashion where the figures are expanded for the better understanding.

Like numbers refer to like elements throughout. In the drawings, the thickness of certain lines, layers, components, elements or features may be exaggerated for clarity. It will be understood that, although the terms "first", "second", etc. may be used herein to describe various elements, these elements should not be limited by these terms. These terms are only used to distinguish one element from another element. Thus, a "first" element discussed below could also be termed a "second" element without departing from the teachings of the present disclosure. As used herein, the singular forms are intended to include the plural forms as well, unless the context clearly indicates otherwise.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof.

In the entire specification, when an element is referred to as being "connected" or "coupled" to another element, it can be directly connected or coupled to the another element or be indirectly connected or coupled to the another element with one or more intervening elements interposed therebetween.

Hereinafter, exemplary embodiments of the present disclosure will be described in more detail with reference to the accompanying drawings.

FIG. 1 is a block diagram illustrating a display device in accordance with embodiments.

Referring to FIG. 1, the display device 10 may include a display panel 100, a scan driver 200, an emission driver 300, a data driver 400, a power voltage generator 500, and a timing controller 600.

The display panel 100 displays an image. The display panel 100 may include a plurality of pixels PX for displaying a predetermined image, and display an image corresponding to an input image data IDT through the plurality of pixels PX.

The plurality of pixels PX may be electrically connected to scan lines SL, first emission control lines ECL1, and data lines DL, respectively. For example, each pixel PX may be electrically connected to a scan line SL and a first emission control line ECL1, which extends along a horizontal direction, and a data line DL which extends along a vertical direction (see FIGS. 1 and 5).

The plurality of pixels PX may be electrically connected to scan lines SL, first emission control lines ECL1, second emission control lines ECL2, and data lines DL, respectively. For example, each pixel PX may be electrically connected to a scan line SL, a first emission control line ECL1, and a second emission control line ECL2 which extend along a horizontal direction, and a data line DL which extend along a vertical direction (see FIGS. 1 and 7).

Although a case where each pixel PX is connected to one scan line SL has been illustrated in FIG. 1, embodiments are not limited thereto. For example, two or more scan lines SL to which different scan signals are applied may extend along the horizontal direction, and each pixel PX may be electrically connected to the two or more scan lines SL.

The plurality of pixels PX may be supplied with driving signals, respectively, and emit light with luminance corresponding to the driving signals. In embodiments, the driving signals may include scan signals supplied to the plurality pixels PX through the respective scan lines SL, first emission control signals EM1 supplied to the plurality of pixels through the respective first emission control lines ECL1, and data signals supplied to the plurality of pixels PX through the respective data lines DL (see FIG. 5). In another embodiments, the driving signals may include scan signals supplied to the plurality pixels PX through the respective scan lines SL, first emission control signals EM1 supplied to the plurality of pixels through the respective first emission control lines ECL1, second emission control signals EM2 supplied to the plurality of pixels PX through the respective second emission control lines ECL2, and data signals supplied to the plurality of pixels PX through the respective data lines DL (see FIG. 7).

The plurality of pixels PX may be supplied with driving voltages from the power voltage generator 500. In embodiments, the driving voltages may include a first power voltage VDD (e.g., a high-potential pixel voltage) and a second power voltage VSS (e.g., a low-potential pixel voltage), and include at least one of a reference power voltage VREF, a first initialization power voltage VINT1, and a second initialization power voltage VINT2.

Signal lines and power lines, which are connected to the plurality of pixels PX, and driving signals and driving voltages, which are supplied from the signal lines and the power lines, are not limited to the above-described embodiment. The signal lines and the power lines, which are connected to the plurality of pixels PX, and the driving signals and/or the driving voltages, which are supplied from the signal lines and the power lines, corresponding to a circuit structure and/or a driving method of the plurality of pixels PX may be variously changed.

The scan driver 200 may receive scan driving signals SCS from the timing controller 600. The scan driving signals SCS may include a sampling signal and/or timing signals necessary for driving of the scan driver 200. The scan driver 200 may supply scan signals respectively to the scan lines SL based on the scan driving control signals SCS. In embodiments, the scan signals may include an initialization signal GI, a write signal GW, and a reset signal GR (see FIG. 5). The initialization signal GI, the write signal GW, and the reset signal GR may respectively supplied to a first scan line SL1, a second scan line SL2, and a third scan line SL3 (see FIG. 5).

Each scan signal may have a gate-on voltage which turns on a transistor supplied with the scan signal. For example, to turn on the transistor, a scan signal having a low level may be supplied to a P-type transistor and a scan signal having a high level may be supplied to an N-type transistor. Accordingly, a transistor receiving each scan signal may be turned on in response to the scan signal.

The emission driver 300 may receive emission driving signals ECS from the timing controller 600. The emission driving signals ECS may include a sampling signal and/or timing signals necessary for driving of the emission driver 300. In embodiments, the emission driver 300 may supply the first emission control signals EM1 respectively to the first emission control lines ECL1 in response to the emission driving signals ECS. For example, the emission driver 300 may sequentially supply the first emission control signals EM1 to the first emission control lines ECL1 in response to the emission driving signals ECS. In another embodiments, the emission driver 300 may supply the first emission control signals EM1 respectively to the first emission control lines ECL1 and supply the second emission control signals EM2 respectively to the second emission control lines ECL2, in response to the emission driving signals ECS. For example, the emission driver 300 may sequentially supply the first emission control signals EM1 to the first emission control lines ECL1 and sequentially supply the second emission control signals EM2 to the second emission control lines ECL2 in response to the emission driving signals.

Each of the emission control signals EM1 and EM2 may have a gate-off voltage which turns off a transistor supplied with each of the emission control signals EM1 and EM2. For example, to turn off the transistor, an emission control signal having a high level may be supplied to a P-type transistor, and an emission control signal having a low level may be supplied to an N-type transistor. Accordingly, a transistor receiving each emission control signal may be turned off in response to the emission control signal to maintain the state in which the transistor is turned off during a period in which the emission control signal is supplied.

Although an embodiment in which the scan driver 200 and the emission driver 300 are provided as components separate from each other has been illustrated in FIG. 1, the embodiments of the present disclosure is not limited thereto. For example, the scan driver 200 and the emission driver 300 may be integrated as one driving circuit, one module, or the like.

The data driver 400 may receive data driving signals DCS and image data DT from the timing controller 600. The data driving signals DCS may include a sampling signal and/or timing signals necessary for driving of the data driver 400. The data driver 400 may supply data signals respectively to the data lines DL in response to the data driving signals DCS and the image data DT. For example, the data driver 400 may generate data signals having analog data voltages corresponding to respective grayscale values included in the image data DT supplied as digital data, and output the data signals to the respective data lines DL. The data signals output to the data lines DL may be supplied to the respective pixels PX.

The power voltage generator 500 may receive power driving signals PCS from the timing controller 600. The power voltage generator 500 may generate driving voltages of the plurality of pixels PX in response to the power driving signals PCS, and supply the driving voltages to the display panel 100 through the respective power lines. In embodiments, the power voltage generator 500 may be a power management integrated circuit (PMIC) or include the PMIC.

In embodiments, the power voltage generator 500 may generate the first power voltage VDD, the second power voltage VSS, the reference power voltage VREF, the first initialization power voltage VINT1, and the second initialization power voltage VINT2, and supply the first power voltage VDD, the second power voltage VSS, the reference power voltage VREF, the first initialization power voltage VINT1, and the second initialization power voltage VINT2 to the display panel 100. Accordingly, the first power voltage VDD, the second power voltage VSS, the reference power voltage VREF, the first initialization power voltage VINT1, and the second initialization power voltage VINT2 may be supplied to each of the pixels PX.

The timing controller 600 may receive input image data IDT and timing control signals TCS from a host system (e.g., an application processor (AP)) through an interface. The timing control signals TCS may include synchronization signals such as a vertical synchronization signal and a horizontal synchronization signal, a data enable signal, a clock signal, and the like.

The timing controller 600 may generate the scan driving signals SCS, the emission driving signals ECS, the data driving signals DCS, and the power driving signals PCS, in response to the timing control signals TCS. The scan driving signals SCS, the emission driving signals ECS, the data driving signals DCS, and the power driving signals PCS may be respectively supplied to the scan driver 200, the emission driver 300, the data driver 400, and the power voltage generator 500.

Figure 2:
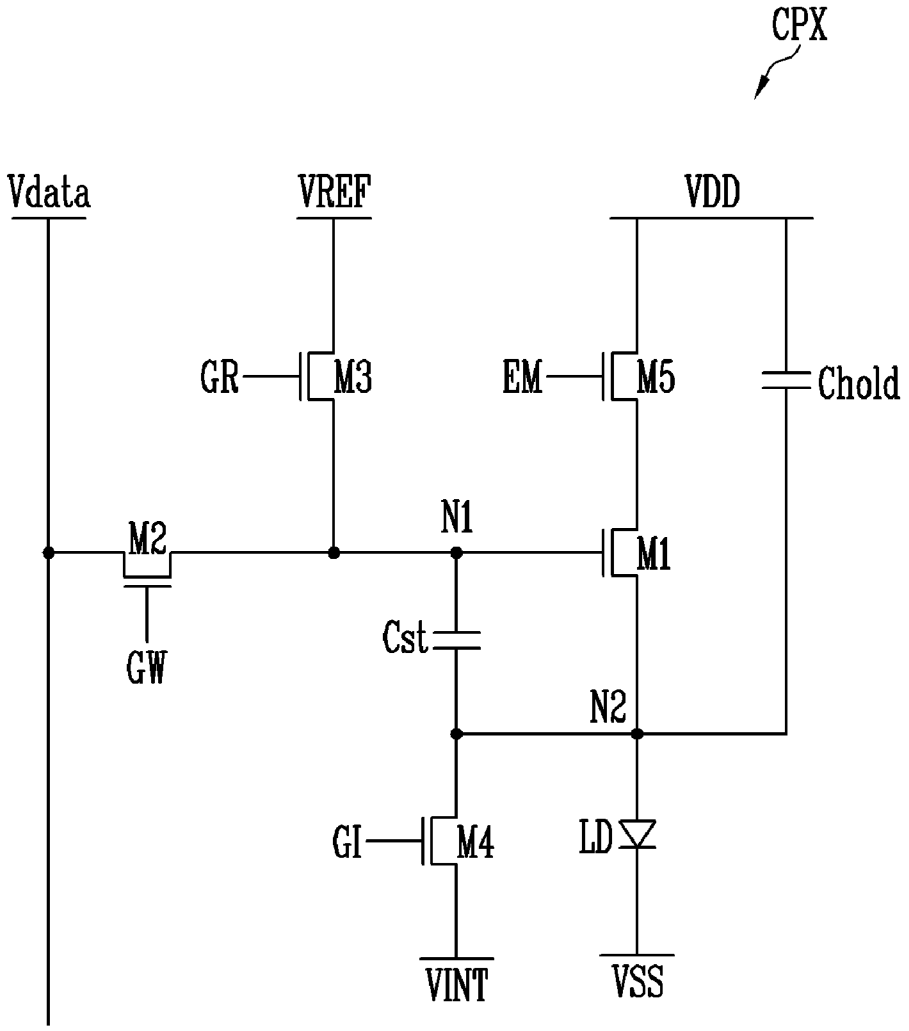
FIG. 2 is a circuit diagram illustrating a pixel in accordance with a comparative example.

FIG. 2 is a circuit diagram illustrating a pixel in accordance with a comparative example.

Figure 3:
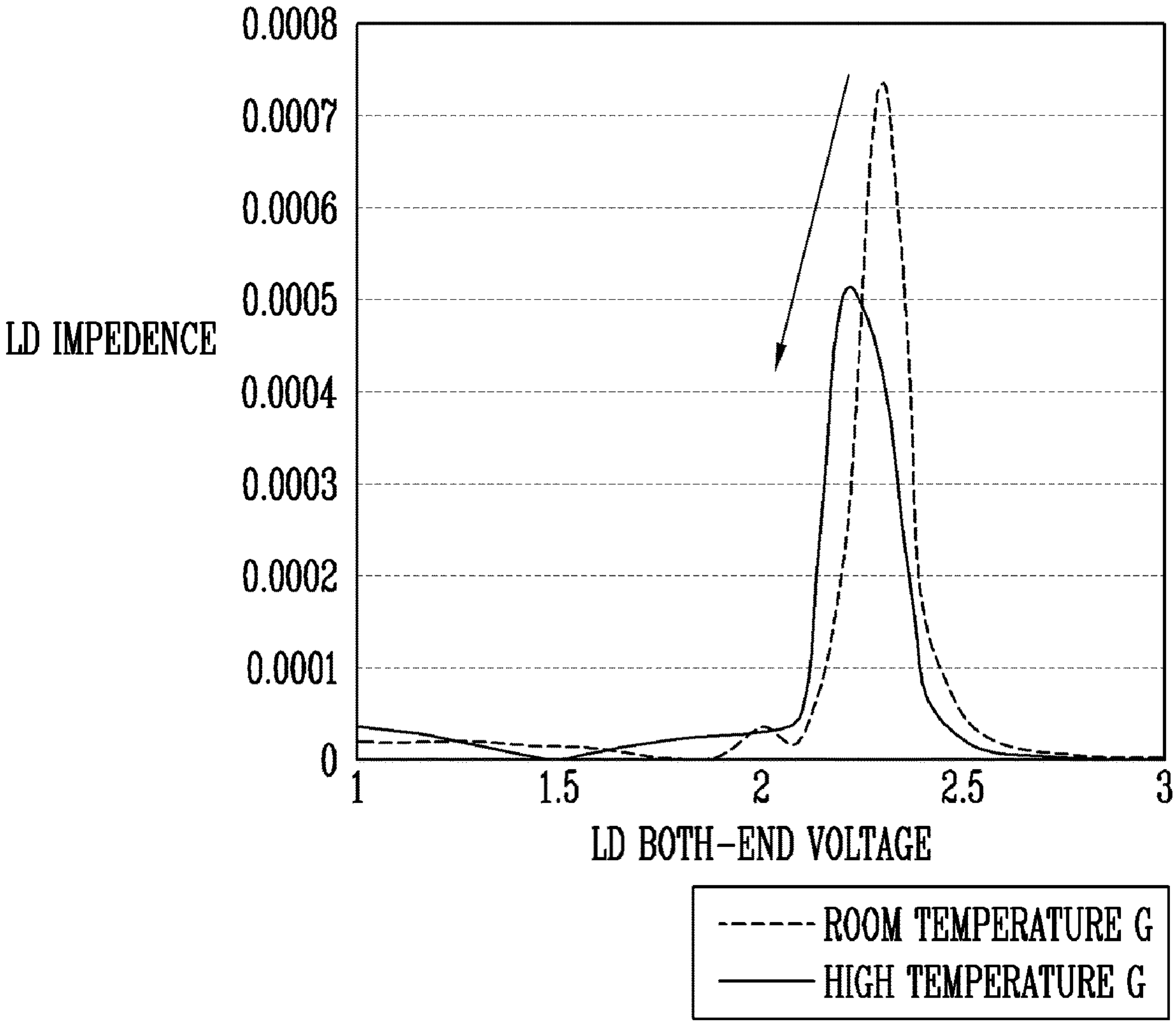
FIG. 3 is a graph illustrating impedance according to temperature of a light emitting element emitting light of green.

FIG. 3 is a graph illustrating impedance according to temperature of a light emitting element emitting light of green.

Figure 4B:
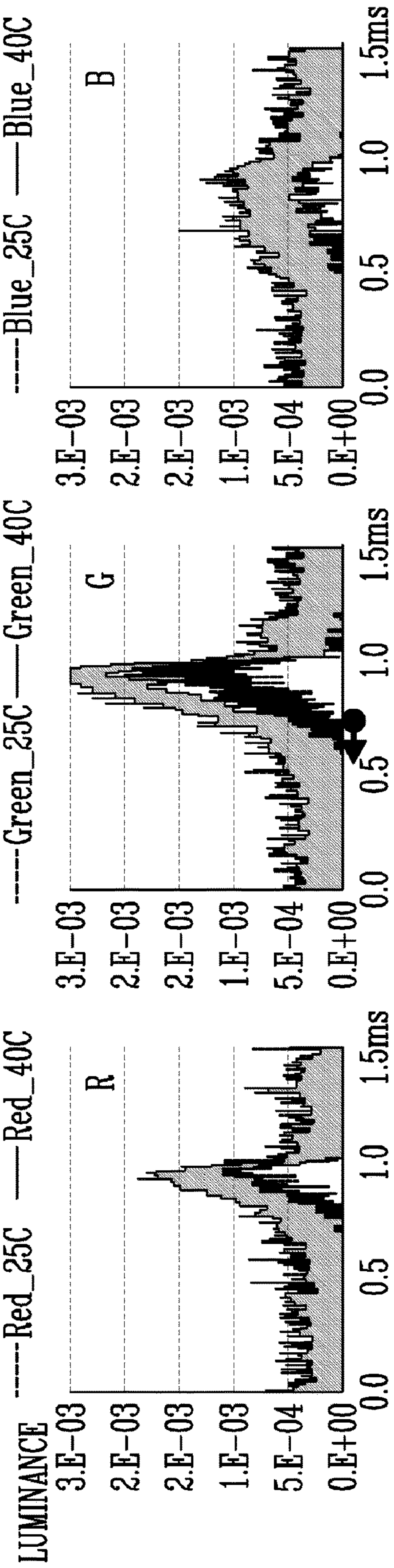
FIG. 4B is a graph illustrating luminance change according to temperature change for each kind of light emitting elements.

FIG. 4A is a table illustrating luminance change and color coordinate change of white according to temperature change for each kind of light emitting elements, and FIG. 4B is a graph illustrating luminance change according to temperature change for each kind of light emitting elements.

It is assumed that FIGS. 3 to 4B are derived when a light emitting element LD is driven in a state in which the light emitting element LD is included in the pixel CPX in accordance with the comparative example, which is shown in FIG. 2.

Referring to FIG. 2, in the pixel CPX in accordance with the comparative example, a source electrode of a driving transistor M1 and an anode of the light emitting element LD are connected to the same node N2. Accordingly, when a fourth transistor M4 is turned on in response to an initialization signal GI, an initialization power voltage VINT is applied to the node N2. That is, the same voltage (i.e., the initialization power voltage VINT) is applied to the source electrode of the driving transistor M1 and the anode of the light emitting element LD.

In the pixel CPX in accordance with the comparative example, threshold voltage compensation of the driving transistor M1 is performed. To this end, a third transistor M3 is turned on in response to a reset signal GR, so that a reference power voltage VREF is applied to a node N1, and the fourth transistor M4 is turned on in response to the initialization signal GI, so that the initialization power voltage VINT is applied to the node N2. The threshold voltage compensation is influenced by an initial gate-source voltage Vgs of the driving transistor M1, i.e., a value obtained by subtracting the initialization power voltage VINT from the reference power voltage VREF. In particular, the threshold voltage compensation may be greatly influenced by a voltage level of the initialization power voltage VINT. For example, when the voltage between the reference power voltage VREF and the initialization power voltage VINT (VREF-VINT) becomes less than a predetermined value due to high voltage value of the initialization power voltage VINT, the threshold voltage compensation is not properly performed, and therefore, a current maintenance rate may be lowered. Accordingly, it is necessary that the initialization power voltage VINT should be set to a voltage level for compensating for a threshold voltage of the driving transistor M1.

Meanwhile, a light emitting element may emit light of red R, green G or blue B according to an emissive electroluminescent layer in the light emitting element LD. An impedance of the light emitting element emitting light of green G may vary. In particular, the impedance of the light emitting element may be decreased at a high temperature. Such impedance variation according to the temperature may occur when the light emitting element emitting light of green G emits light with a luminance corresponding to an ultra-low grayscale. The ultra-low grayscale corresponds to a luminance of 1 nit or less, and may correspond to, for example, grayscale 11.

Referring to FIGS. 2 and 3, when the temperature increases from a room temperature to a high temperature, the impedance of the light emitting element LD emitting light of green G decreases, and therefore, a light emission amount of the light emitting element LD emitting light of green G at the ultra-low grayscale may be increased.

Also, referring to FIGS. 2 and 4A, it can be seen that, when the temperature rises from 25° C. to 40° C., a luminance change of the light emitting element LD emitting light of green G and a change in color coordinate (Δx, Δy) of white W are not large at grayscale 31 Oxide @31G. Also, it can be seen that, at grayscale 11 LTPS @11G corresponding to the ultra-low grayscale, the luminance change of the light emitting element LD emitting light of green G and the change in color coordinate (Δx, Δy) of white W are not large even when the driving transistor M1 is a P-type transistor such as Low Temperature Polycrystalline Silicon. On the other hand, it can be seen that, at the grayscale 11 Oxide @11G corresponding to the ultra-low grayscale, the luminance change of the light emitting element LD emitting light of green G and the change in color coordinate (Δx, Δy) of white W are very large when the temperature rises from 25° C. to 40° C. in a case where the driving transistor M1 is an N-type transistor such as oxide.

Also, referring to FIGS. 1, 4A, and 4B, it can be seen that, while a luminance change of the light emitting element LD emitting light of red R or blue B according to time is low, the luminance change of the light emitting element LD emitting light of green G over time is very large, when the temperature rises from 25° C. to 40° C.

As described above, since the light emitting element LD emitting light of green G has high temperature sensitivity, the impedance of the light emitting element LD varies according to the temperature, and therefore, a change in light emission amount is large. Accordingly, a color deviation between the light emitting element LD emitting light of green G and the light emitting element emitting light of red R or blue B may be caused, thereby deteriorating the image quality of the display device.

The temperature sensitivity of the light emitting element LD may be compensated by decreasing a number of times the initialization power voltage VINT is applied to the anode of the light emitting element LD or minimizing a time for which the impedance of the light emitting element LD is influenced through setting of the initialization power voltage VINT as a turn-on voltage of the light emitting element LD. However, as described above, since the threshold voltage compensation is greatly influenced according to the voltage level of the initialization power voltage VINT, the threshold voltage compensation may be deteriorated when the initialization power voltage VINT is set to the voltage level for compensating for the temperature sensitivity of the light emitting element LD.

As described above, in the pixel CPX in accordance with the comparative example, an initialization voltage for threshold voltage compensation and an initialization voltage for temperature sensitivity compensation of the light emitting element LD are the same as the initialization power voltage VINT, and therefore, the threshold voltage compensation and the temperature sensitivity compensation of the light emitting element LD cannot be simultaneously performed.

Accordingly, in the present disclosure, an initialization voltage applied to the source electrode of the driving transistor T1 and an initialization voltage applied to the anode of the light emitting element LD are separated from each other and are independently controlled, so that the temperature sensitivity of the light emitting element LD can be improved while not deteriorating the threshold voltage compensation.

Figure 5:
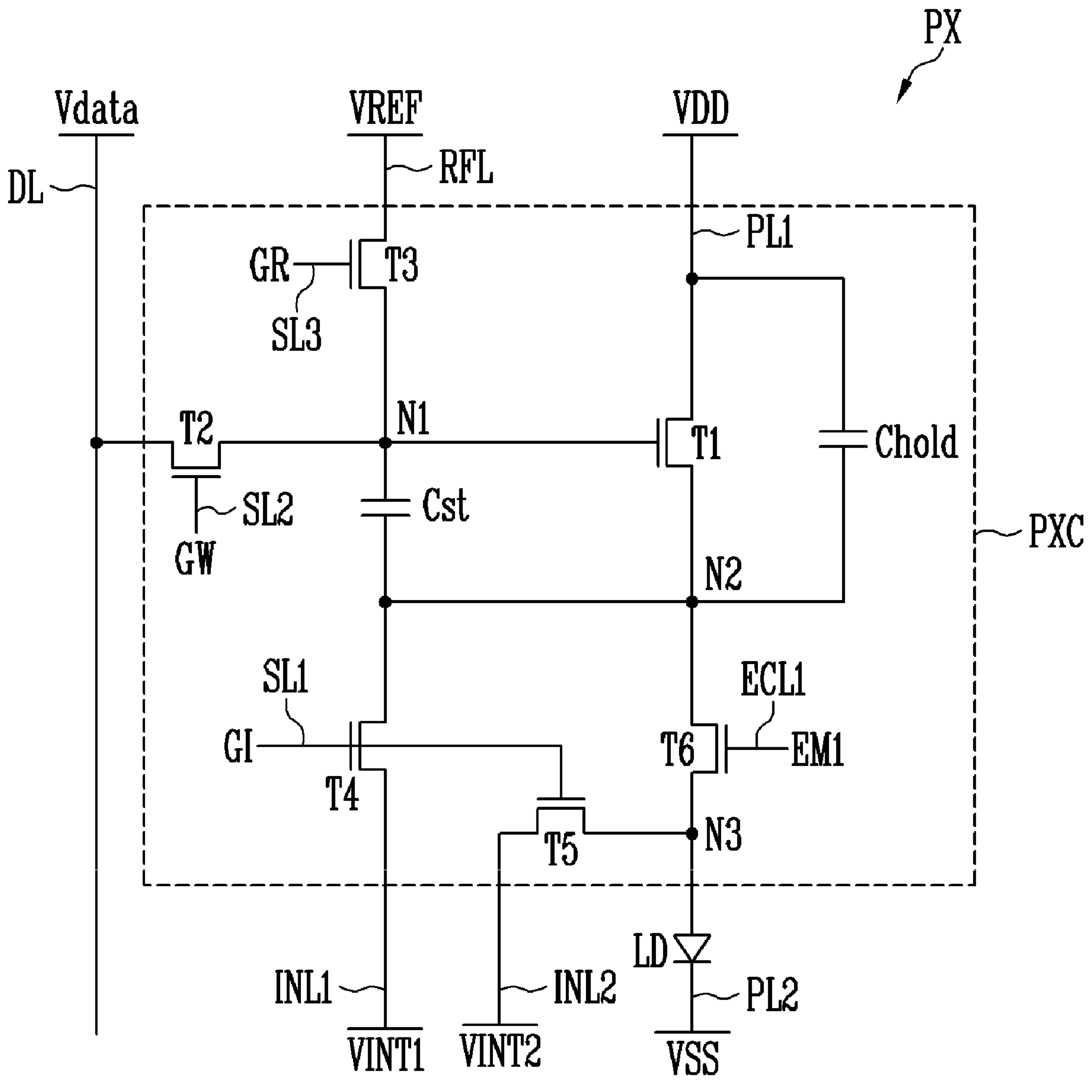
FIG. 5 is a circuit diagram illustrating a pixel in accordance with embodiments.

FIG. 5 is a circuit diagram illustrating a pixel in accordance with an embodiment of the present disclosure.

Referring to FIG. 5, the pixel PX in accordance with the embodiment of the present disclosure may be connected to signal lines extending along the horizontal direction and along the vertical direction. For example, the pixel PX may be connected to at least one scan line SL and a first emission control line ECL1 extending along the horizontal direction, and a data line DL extending along the vertical direction. In embodiments, the pixel PX may be connected to a first scan line SL1, a second scan line SL2, a third scan line SL3, and the first emission control line ECL1 and a data line DL.

The pixel PX may be further connected to power lines. For example, the pixel PX may be connected to a first power line PL1 and a second power line PL2. In embodiments, the pixel PX may be further connected to a reference power line RFL, a first initialization power line INL1, and a second initialization power line INL2.

The pixel PX may include a pixel circuit PXC and a light emitting element LD connected to the pixel circuit PXC. The pixel circuit PXC may include a driving transistor T1, a first switching transistor T2, and a first capacitor Cst. In embodiments, the pixel circuit PXC may further include a second switching transistor T3, a first initialization transistor T4, a second initialization transistor T5, a control transistor T6, and a second capacitor Chold.

The pixel PX may be driven by driving signals and driving voltages. The driving signals DRS may include a write signal GW and a data signal (e.g., a data voltage Vdata). In embodiments, the driving signals DRS may further include a reset signal GR, an initialization signal GI, and/or a first emission control signal EM1. The driving voltages may include a first power voltage VDD and a second power voltage VSS. In embodiments, the driving voltages may further include a reference power voltage VREF, a first initialization power voltage VINT1, and/or a second initialization power voltage VINT2.

A gate electrode of the driving transistor T1 may be connected to a first node N1, and the driving transistor T1 may be connected between the first power line PL1 and a second node N2. In embodiments, the driving transistor T1 may be connected directly to the first power line PL1. For example, a first electrode of the driving transistor T1 may be connected directly to the first power line PL1, and a second electrode of the driving transistor T1 may be connected to the second node N2. The first power line PL1 may be a power line to which the first power voltage VDD is applied. The first node N1 may be a node between the driving transistor T1 and the first switching transistor T2, and the second node N2 may be a node between the driving transistor T1 and the control transistor T6.

The driving transistor T1 may supply a driving current to the light emitting element LD. For example, the driving transistor T1 may supply a driving current corresponding to a voltage of the first node N1, i.e., the data voltage Vdata, to the light emitting element LD.

A gate electrode of the first switching transistor T2 may be connected to the second scan line SL2, and the first switching transistor T2 may be connected between the data line DL and the first node N1.

The first switching transistor T2 may be turned on in response to the write signal GW applied to the second scan line SL2. When the first switching transistor T2 is turned on, the data signal (e.g., the data voltage Vdata) supplied from the data line DL may be applied to the first node N1.

A gate electrode of the second switching transistor T3 may be connected to the third scan line SL3, and the second switching transistor T3 may be connected between the reference power line RFL and the first node N1. The reference power line RFL may be a power line to which the reference power voltage VREF is applied.

The second switching transistor T3 may be turned on in response to the reset signal GR applied to the third scan line SL3. When the second switching transistor T3 is turned on, the reference power voltage VREF may be applied to the first node N1.

A gate electrode of the first initialization transistor T4 may be connected to the first scan line SL1, and the first initialization transistor T4 may be connected between the second node N2 and the first initialization power line INL1. The first initialization power line INL1 may be a power line to which the first initialization power voltage VINT1 is applied.

The first initialization transistor T4 may be turned on in response to the initialization signal GI applied to the first scan line SL1. When the first initialization transistor T4 is turned on, the first initialization power voltage VINT1 may be applied to the second node N2, and accordingly, a threshold voltage of the driving transistor T1 can be compensated.

A gate electrode of the second initialization transistor T5 may be connected to the first scan line SL1, and the second initialization transistor T5 may be connected between a third node N3 and the second initialization power line INL2. The second initialization power line INL2 may be a power line to which the second initialization power voltage VINT2 is applied. The third node N3 may be a node between the control transistor T6 and the light emitting element LD (or an anode of the light emitting element LD).

The second initialization transistor T5 may be turned on in response to the initialization signal GI applied to the first scan line SL1. When the second initialization transistor T5 is turned on, the second initialization power voltage VINT2 may be applied to the third node N3, and accordingly, the anode of the light emitting element LD can be initialized.

A gate electrode of the control transistor T6 may be connected to the first emission control line ECL1, and the control transistor T6 may be connected between the second node N2 and the third node N3. For example, a first electrode of the control transistor T6 may be connected to the second node N2, and a second electrode of the control transistor T6 may be connected to the third node N3.

The control transistor T6 may be turned off in response to the first emission control signal EM1 supplied to the first emission control line ECL1. When the control transistor T6 is turned off, a current path through which the driving current can flow may be interrupted in the pixel PX, and accordingly, the driving current may not be supplied to the light emitting element LD.

The control transistor T6 may separate a point at which the first initialization power voltage VINT1 and the second initialization power voltage VINT2 are applied. For example, when the first initialization transistor T4 is turned on, the first initialization power voltage VINT1 may be applied to the second node N2. When the second initialization transistor T5 is turned on, the second initialization power voltage VINT2 may be applied to the third node N3. Accordingly, compensation of the threshold voltage of the driving transistor T1 and initialization of the anode of the light emitting element LD can be independently performed.

Although T1 to T6 may be implemented with an N-type transistor, embodiments are not limited thereto. For example, at least one of T1 to T6 may be changed to a P-type transistor. Signal levels (e.g., voltage levels) of the driving signals DRS for controlling driving of each transistor may be set according to a type of the transistor.

The first capacitor Cst may be connected between the first node N1 and the second node N2. A voltage corresponding to the data signal may be stored in the first capacitor Cst.

The second capacitor Chold may be connected between the first power line PL1 and the second node N2. The second capacitor Chold may stabilize a voltage of the second node N2.

The light emitting element LD may be connected between the third node N3 and the second power line PL2. For example, the light emitting element LD may be connected in a forward direction between the third node N3 and the second power line PL2. The second power line PL2 may be a power line to which the second power voltage VSS is applied. When the driving current is supplied from the driving transistor T1, the light emitting element LD may emit light with a luminance corresponding to the driving current.

In embodiments, the light emitting element LD may include an organic light emitting diode. In another embodiments, the light emitting element LD may include at least one inorganic light emitting diode. The kind, size, and/or number of light emitting elements LD may be changed in some embodiments.

Figure 6:
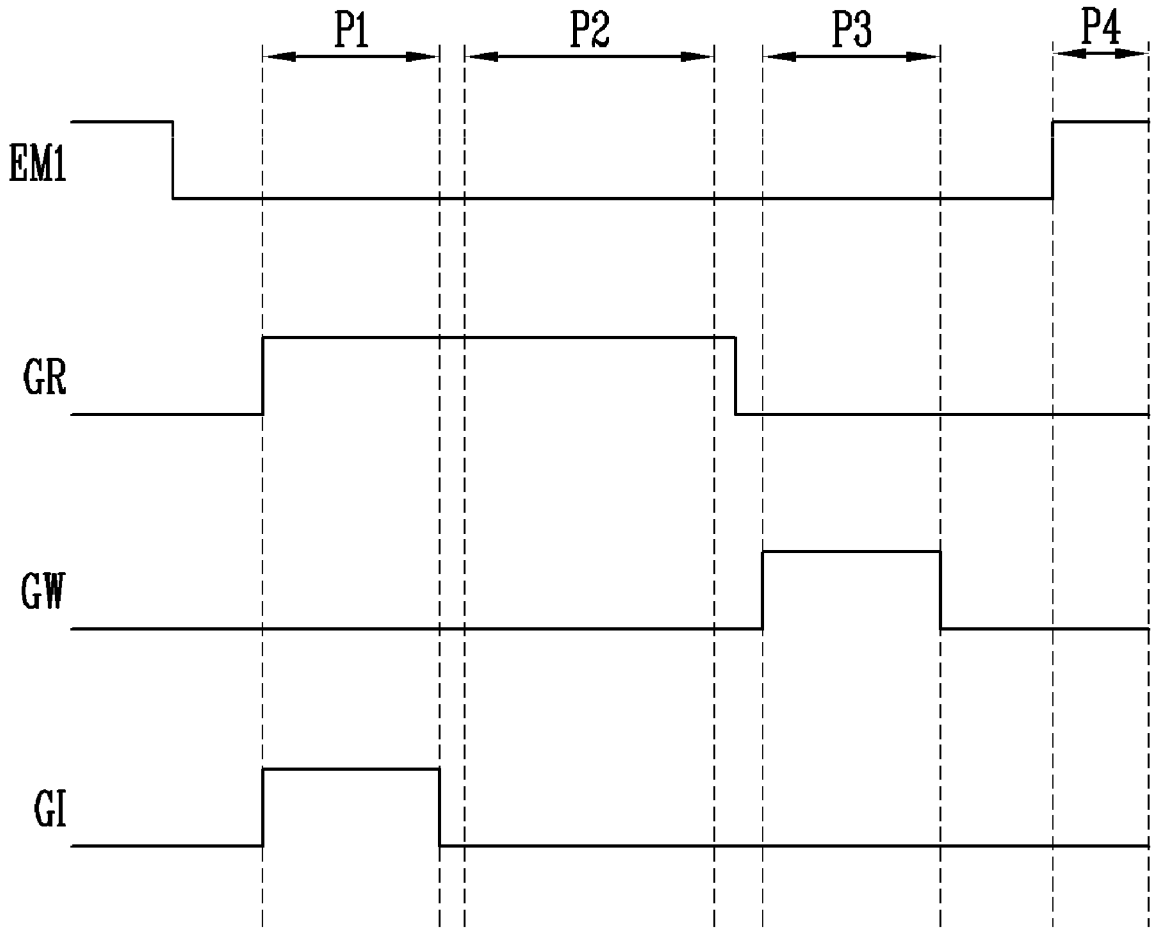
FIG. 6 is a waveform diagram illustrating driving signals supplied to the pixel shown in FIG. 5.

FIG. 6 is a waveform diagram illustrating driving signals supplied to the pixel shown in FIG. 5. For example, FIG. 6 illustrates an example of the write signal GW, the reset signal GR, the initialization signal GI, and the first emission control signal EM1, which are used to control an operation timing of the pixel PX. In the display panel 100 shown in FIG. 1, pixels PX disposed on the same horizontal line may be simultaneously driven, and pixels PX disposed on different horizontal lines may be sequentially driven corresponding to respective horizontal periods.

Referring to FIGS. 5 and 6, a driving method of the pixel PX in accordance with an embodiment of the present disclosure may include an initialization period, a threshold voltage compensation period, ad data writing period, and a light emitting period.

The initialization period may be performed during a first period P1. In the initialization period, the first initialization power voltage VINT1 may be applied to the second node N2 by turning on the first initialization transistor T4, and the second initialization power voltage VINT2 may be applied to the third node N3 by turning on the second initialization transistor T5. To this end, the initialization signal GI having a gate-on voltage may be applied to the first scan line SL1 during the first period P1, and accordingly, an initialization operation of the driving transistor T1 and an initialization operation of the light emitting element LD can be simultaneously performed.

The first initialization power voltage VINT1 may be set to a voltage level for compensating for the threshold voltage of the driving transistor T1, which will be described later, and the second initialization power voltage VINT2 may be set to a voltage level for compensating for temperature sensitivity of the light emitting element LD. In embodiments, the second initialization power voltage VINT2 may have a voltage level higher than a voltage level of the voltage level of the first initialization power voltage VINT1. For example, the first initialization power voltage VINT1 may be −3V, and the second initialization power voltage VINT2 may be 0V. Accordingly, the compensation of the temperature sensitivity of the light emitting element LD can be improved while not deteriorating the compensation of the threshold voltage of the driving transistor T1.

Meanwhile, in order to maintain the light emitting element LD in a non-emission state during the initialization period, the second initialization power voltage VINT2 may be set to a voltage level at which the light emitting element LD can be maintained in the non-emission state, i.e., a voltage level lower than a voltage level of the threshold voltage of the light emitting element LD.

In addition, the reference power voltage VREF may be supplied to the first node N1 by turning on the second switching transistor T3 together in the initialization period. To this end, the reset signal GR having the gate-on voltage may be applied together to the third scan line SL3 during the first period P1.

In addition, the supply of the driving current generated by the driving transistor T1 to the light emitting element LD may be interrupted by turning off the control transistor T6 in the initialization period. To this end, the first emission control signal EM1 having a gate-off voltage may be applied to the first emission control signal ECL1 during the first period P1.

Through the above-described initialization operation, the pixel PX may be initialized not to be influenced by a data signal supplied in a previous unit period (e.g., a previous frame period).

The threshold voltage compensation period may be performed during a second period P2. In the threshold voltage compensation period, the reference power voltage VREF may be supplied to the first node N1 by turning on the second switching transistor T3. To this end, the reset signal GR having the gate-on voltage may be supplied to the third scan line SL3 during the second period P2.

In addition, the supply of the driving current generated by the driving transistor T1 to the light emitting element LD may be blocked by turning off the control transistor T6 in the threshold voltage compensation period. To this end, the first emission control signal EM1 having the gate-off voltage may be supplied to the first emission control line ECL1 during the second period P2.

In the threshold voltage compensation period, threshold voltage compensation may be performed according to the first initialization power voltage VINT1 set to a voltage level for compensating for the threshold voltage of the driving transistor T1 regardless of the second initialization power voltage VINT2 for initializing the anode of the light emitting element LD. That is, during the second period P2, the voltage of the first node N1 is maintained as the reference power voltage VREF, and the voltage of the second node N2 is changed from the first initialization power voltage VINT1 to a value obtained by subtracting the threshold voltage of the driving transistor T1 from the reference power voltage VREF. Accordingly, a threshold voltage of the driving transistor T1 which corresponds to a difference between the voltage of the first node N1 and the voltage of the second node N2, may be stored in the first capacitor Cst.

A duration time of the threshold voltage compensation period (e.g., a maintenance time of the second period P2) may be determined by the reset signal GR. For example, the duration time of the threshold voltage compensation period may be adjusted by adjusting a width of the reset signal GR having the gate-on voltage.

The data writing period may be performed during a third period P3. In the data writing period, a data signal may be applied to the first node N1 by turning on the first switching transistor T2. For example, the data signal transferred from the data line DL may be applied to the first node N1 via the first switching transistor T2 in the data writing period.

To this end, the write signal GW having the gate-on voltage may be supplied to the second scan line SL2 during the third period P3. Accordingly, during the third period P3, the first switching transistor T2 may maintain an on-state, and the second switching transistor T3, the first initialization transistor T4, the second initialization transistor T5, and the control transistor T6 may maintain an off-state.

During the third period P3, the voltage of the first node N1 may be maintained as the voltage of the data signal (e.g., the data voltage Vdata), and the voltage of the second node N2 may be maintained as VREF-Vth. However, the present disclosure is not limited thereto. In an example, during the third period P3, the first node N1 may be changed from the reference power voltage VREF to the data voltage Vdata, and the voltage of the second node N2 may be changed corresponding to a voltage variation of the first node N1 according to coupling of the first capacitor Cst. However, in the embodiment of the present disclosure, a capacitance of the second capacitor Chold may be set greater than a capacitance of the first capacitor Cst, and accordingly, a voltage variation of the second node N2 can be minimized during the third period P3. Subsequently, for convenience of description, it is assumed that the second node N2 maintains a voltage of VREF-Vth during the third period P3.

Finally, the light emitting period may be performed during a fourth period P4. In the light emitting period, a driving current corresponding to the voltage stored in the first capacitor Cst may be supplied to the light emitting element LD.

To this end, during the fourth period P4, the initialization signal GI, the write signal GW, and the reset signal GR having the gate-off voltage may be supplied respectively to the first scan line SL1, the second scan line SL2, and the third scan line SL3. For example, the first scan line SL1, the second scan line SL2, and the third scan line SL3 may have the gate-off voltage during the fourth period P4.

In addition, the first emission control signal EM1 having the gate-on voltage may be supplied to the first emission control line ECL1 during the fourth period P4. For example, the first emission control line ECL1 may have the gate-on voltage during the fourth period P4. Accordingly, the control transistor T6 may be turned on.

In the light emitting period, as an anode voltage of the light emitting element LD (or the voltage of the third node N3) is changed from the second initialization power voltage VINT2 to a voltage corresponding to the driving current, regardless of the first initialization power voltage VINT1 for initializing the driving transistor T1, the light emitting element LD may emit light. As the second initialization power voltage VINT2 is set to the voltage level for compensating for the temperature sensitivity of the light emitting element LD, i.e., a voltage level higher than a voltage level of the first initialization power voltage VINT1, impedance influence of the light emitting element LD, which varies according to temperature in a process of increasing the anode voltage of the light emitting element LD, can be reduced, and thus the temperature sensitivity of the light emitting element LD can be reduced.

Figure 7:
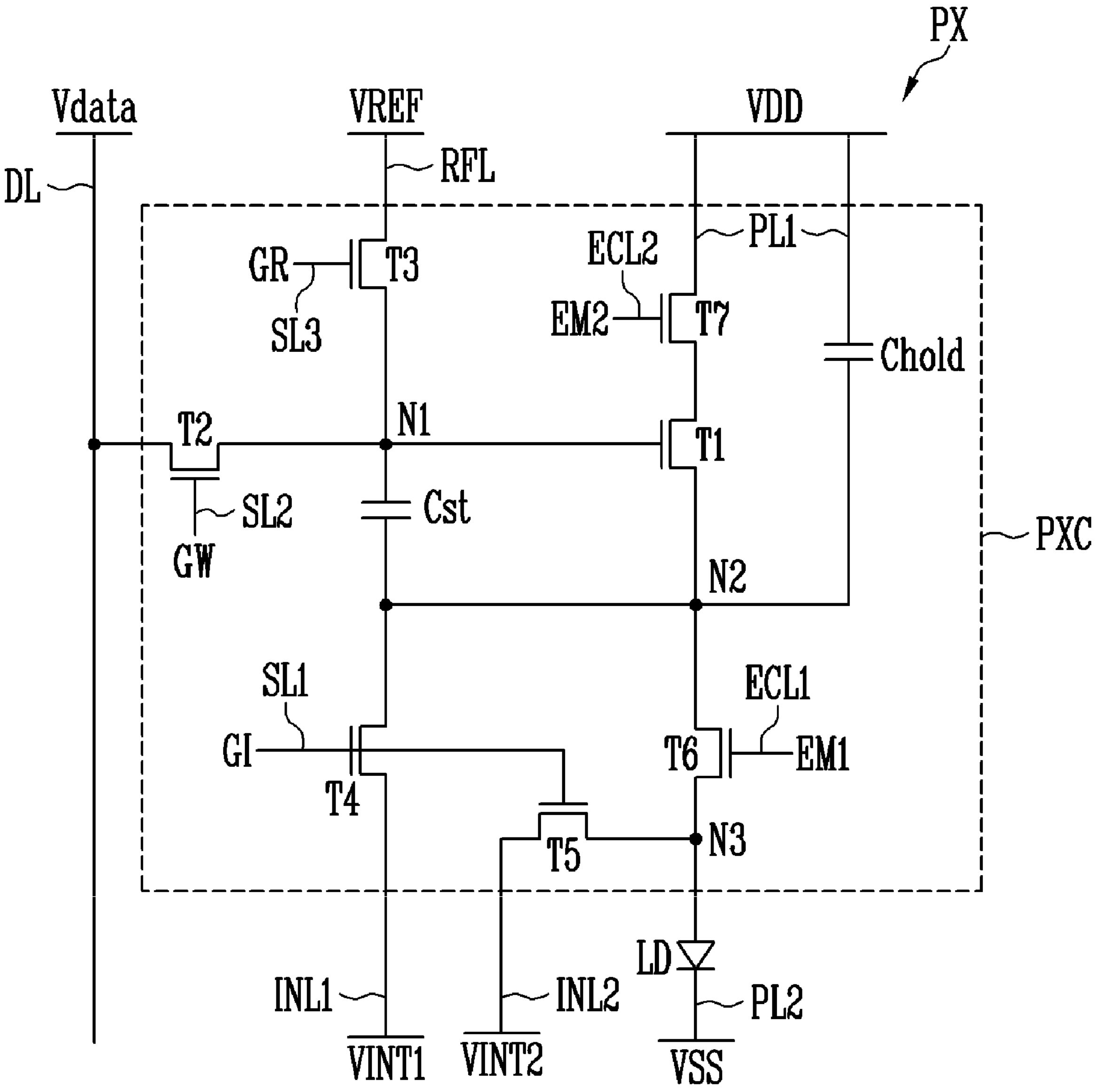
FIG. 7 is a circuit diagram illustrating a pixel in accordance with another embodiments.

FIG. 7 is a circuit diagram illustrating a pixel in accordance with another embodiment of the present disclosure. The pixel PX shown in FIG. 7 is different from the pixel PX shown in FIG. 5, in that the pixel PX shown in FIG. 7 further includes a third switching transistor T7, and the other structure may be substantially identical to the structure of the pixel PX shown in FIG. 5. Therefore, in relation to FIG. 7, descriptions of portions overlapping with the portions shown in FIG. 5 will be omitted.

Referring to FIG. 7, the pixel PX may include a pixel circuit PXC and a light emitting element LD connected to the pixel circuit PXC. The pixel circuit PXC may include a driving transistor T1, a first switching transistor T2, and a first capacitor Cst. In embodiments, the pixel circuit PXC may further include a second switching transistor T3, a first initialization transistor T4, a second initialization transistor T5, a control transistor T6, a third switching transistor T7, and a second capacitor Chold.

The third switching transistor T7 may be connected between the first power line PL1 and the driving transistor T1. A gate electrode of the third switching transistor T7 may be connected to a second emission control line ECL2.

The third switching transistor T7 may be turned off in response to a second emission control signal EM2 supplied to the second emission control line ECL2. When the third switching transistor T7 is turned off, a current path through which a driving current can flow may be interrupted in the pixel PX, and accordingly, the driving current may not be supplied to the light emitting element LD.

Although the third switching transistor T7 may be an N-type transistor, embodiments are not limited thereto. For example, the third switching transistor T7 may be changed to a P-type transistor. A signal level (e.g., a voltage level) of the second emission control signal EM2 for controlling driving of the third switching transistor T7 may be set according to a type of the third switching transistor T7.

Figure 8:
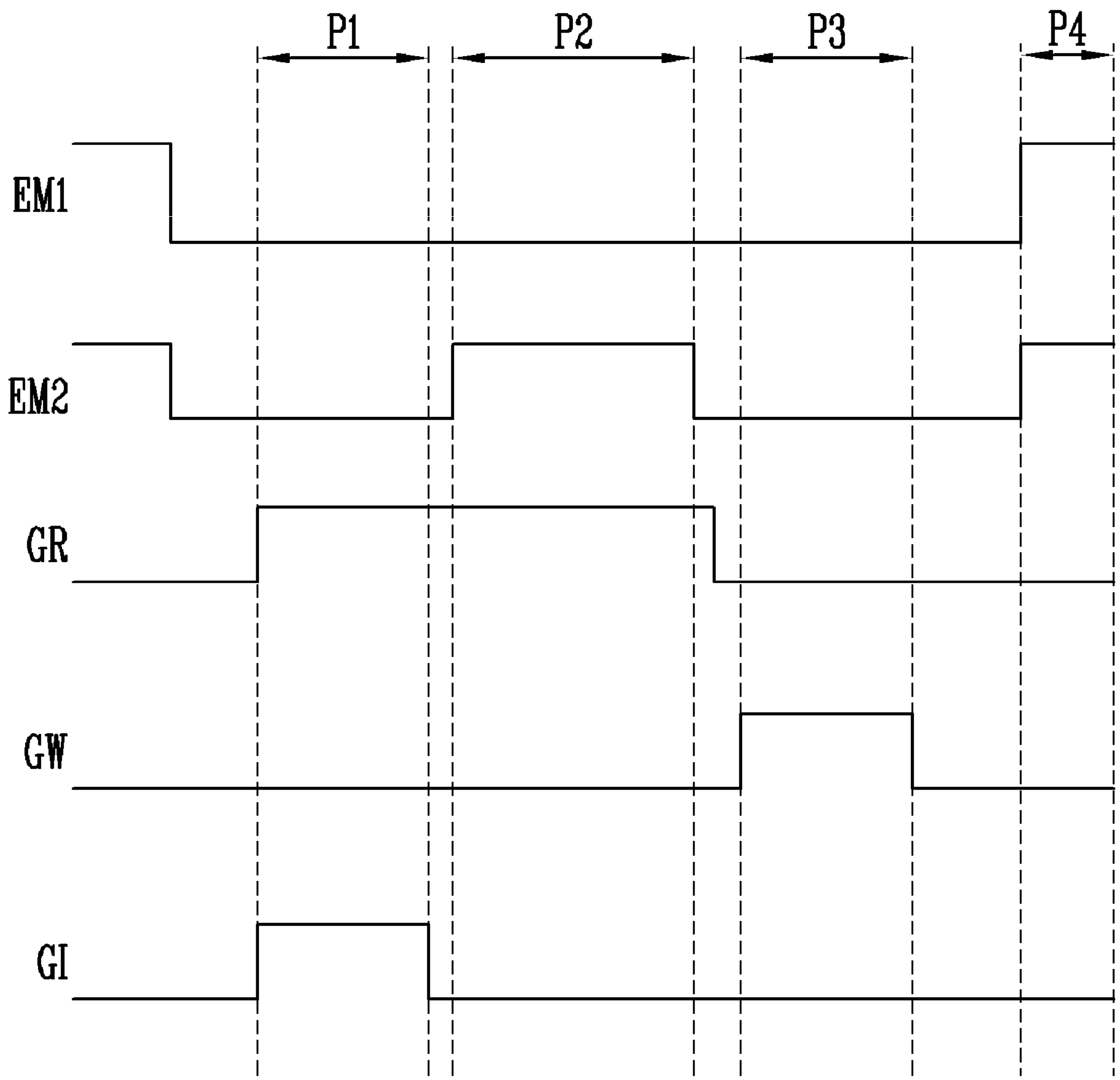
FIG. 8 is a waveform diagram illustrating driving signals supplied to the pixel shown in FIG. 7.

FIG. 8 is a waveform diagram illustrating driving signals supplied to the pixel shown in FIG. 7. FIG. 8 is different from FIG. 6 in that the second emission control signal EM2 applied to the third switching transistor T7 through the second emission control signal ECL2 is further included, and the other portion may be substantially identical to the portion shown in FIG. 6. Therefore, in relation to FIG. 8, descriptions of portions overlapping with the portions shown in FIG. 6 will be omitted.

Referring to FIGS. 7 and 8, a driving method of the pixel PX in accordance with another embodiment of the present disclosure may include an initialization period, a threshold voltage compensation period, a data writing period, and a light emitting period.

Referring to FIGS. 7 and 8, in the initialization period, the third switching transistor T7 may be turned off, thereby blocking a driving current from being generated by the driving transistor T1. To this end, the second emission control signal EM2 having the gate-off voltage may be supplied to the second emission control line ECL2 during a first period P1.

In the threshold voltage compensation period, the third switching transistor T7 may be turned on, thereby storing a threshold voltage of the driving transistor T1 in the first capacitor Cst. To this end, the second emission control signal EM2 having the gate-on voltage may be supplied to the second emission control line ECL2 during a second period P2. Accordingly, the third switching transistor T7 may be turned on during the second period P2.

In the data writing period, the third switching transistor T7 may be turned off. To this end, the second emission control signal EM2 having the gate-off voltage may be supplied to the second emission control line ECL2 during a third period P3. Accordingly, the third switching transistor T7 may be turned off during the third period P3.

Finally, in the light emitting period, the third switching transistor T7 may be turned on, thereby supplying a driving current corresponding to the voltage stored in the first capacitor Cst to the light emitting element LD. To this end, the second emission control signal EM2 having the gate-on voltage may be supplied to the second emission control line ECL2 during a fourth period P4. Accordingly, the third switching transistor T7 may be turned on.

In accordance with the above-described embodiments, the first initialization power voltage VINT1 for initializing the driving transistor T1 and the second initialization power voltage VINT2 for initializing the anode of the light emitting element LD are separated from each other and independently controlled. Thus, the temperature sensitivity of the light emitting element LD can be reduced while not deteriorating the threshold voltage compensation. Accordingly, a color deviation is decreased, so that the image quality of the display device 10 can be improved.

In accordance with the present disclosure, a voltage for initializing an anode of a light emitting element and a voltage for initializing a source electrode of a driving transistor are separated from each other and independently controlled. Thus, the temperature sensitivity of the light emitting element can be reduced while preventing deterioration of threshold voltage compensation of the driving transistor.

Although the present disclosure has been described in detail in connection with the specific embodiments, it will be readily understood by those skilled in the art that various modifications and changes can be made thereto within the technical spirit and scope of the present disclosure. It is also apparent that the modifications and changes fall within the scope of the present disclosure defined by the appended claims.

It is understood that the scope of the present disclosure is represented by the claims which will be described later rather than by the above detailed description, and the meaning and scope of the claims as well as any modifications or variations derived from the equivalent concept of the claims are included in the scope of the present disclosure.

What is claimed is:

1. A pixel comprising:
- a driving transistor having a gate electrode connected to a first node, the driving transistor being connected between a first power line to which a first power voltage is applied and a second node;
- a first initialization transistor having a gate electrode connected to a first scan line, the first initialization transistor being connected between the second node and a first initialization power line to which a first initialization power voltage is applied;
- a second initialization transistor having a gate electrode connected to the first scan line, the second initialization transistor being connected between a third node and a second initialization power line to which a second initialization power voltage is applied;
- a second switching transistor having a gate electrode connected to a third scan line, the second switching transistor being connected between a reference power line to which a reference power voltage is applied and the first node;
- a first capacitor connected between the first node and the second node;
- a second capacitor connected between the first power line and the second node; and
- a light emitting element connected between the third node and a second power line.

2. The pixel of claim 1, further comprising a control transistor having a gate electrode connected to a first emission control line, the control transistor being connected between the second node and the third node.

3. The pixel of claim 1, wherein the driving transistor is connected directly to the first power line.

4. The pixel of claim 1, wherein the second initialization power voltage has a voltage level higher than a voltage level of the first initialization power voltage and has a voltage level lower than a voltage level of a threshold voltage of the light emitting element.

5. The pixel of claim 1, further comprising a first switching transistor having a gate electrode connected to a second scan line, the first switching transistor being connected between a data line to which a data signal is applied and the first node.

6. The pixel of claim 1, further comprising a third switching transistor having a gate electrode connected to a second emission control line, the third switching transistor being connected between the first power line and the driving transistor.

7. A pixel comprising:
- a driving transistor having a gate electrode connected to a first node, the driving transistor being connected between a first power line to which a first power voltage is applied and a second node;
- a first initialization transistor having a gate electrode connected to a first scan line, the first initialization transistor being turned on in response to an initialization signal applied to the first scan line during a first period;
- a second initialization transistor having a gate electrode connected to the first scan line, the second initialization transistor being turned on in response to the initialization signal applied to the first scan line during the first period;
- a second switching transistor having a gate electrode connected to a third scan line, the second switching transistor being turned on in response to a reset signal applied to the third scan line during the first period and a second period;

a first capacitor connected between the first node and the second node;

a second capacitor connected between the first power line and the second node; and a light emitting element connected between a third node and a second power line.

8. The pixel of claim 7, wherein, in the first period, a first initialization power voltage for initializing the driving transistor is applied to the second node.

9. The pixel of claim 8, wherein, in the first period, a second initialization power voltage for initializing an anode of the light emitting element is applied to the third node.

10. The pixel of claim 9, wherein the second initialization power voltage has a voltage level higher than a voltage level of the first initialization power voltage and has a voltage level lower than a voltage level of a threshold voltage of the light emitting element.

11. The pixel of claim 7, wherein, in the first period and the second period, a reference power voltage is applied to the first node.

12. The pixel of claim 7, further comprising a control transistor having a gate electrode connected to a first emission control line, the control transistor being turned off in response to a first emission control signal applied to the first emission control line during the first period and the second period.

13. The pixel of claim 7, further comprising a first switching transistor having a gate electrode connected to a second scan line, the first switching transistor being turned on in response to a write signal applied to the second scan line during a third period.

14. The pixel of claim 13, wherein, in the third period, a data voltage is applied to the first node.

15. The pixel of claim 7, further comprising a third switching transistor having a gate electrode connected to a second emission control line, the third switching transistor being turned off in response to a second emission control signal applied to the second emission control line during the first period.

16. The pixel of claim 15, wherein the third switching transistor is turned on in response to the second emission control signal applied to the second emission control line during the second period.

* * * * *